(No Model.) 9 Sheets—Sheet 1.

F. SHICKLE.
TRAVELING CRANE.

No. 345,736. Patented July 20, 1886.

Fig. I.

Attest:
J. W. Hoke.
Edward W. Purrell

Inventor:
Frederick Shickle
by C. O. Moody
atty (No Model.) 9 Sheets—Sheet 3.

F. SHICKLE.
TRAVELING CRANE.

No. 345,736. Patented July 20, 1886.

Attest:
J. W. Hoke.
Edward W. Furrell.

Inventor:
Frederick Shickle
by C. D. Moody
atty

(No Model.) 9 Sheets—Sheet 4.

F. SHICKLE.
TRAVELING CRANE.

No. 345,736. Patented July 20, 1886.

Attest:
J. W. Hoke.
Edward W. Furrell.

Inventor:
Frederick Shickle
by C D Moody
atty (No Model.) 9 Sheets—Sheet 5.

F. SHICKLE.
TRAVELING CRANE.

No. 345,736. Patented July 20, 1886.

Attest:
J. W. Hoke.
Edward W. Farrell.

Inventor:
Frederick Shickle
by C. D. Moody
atty (No Model.) 9 Sheets—Sheet 8.

F. SHICKLE.
TRAVELING CRANE.

No. 345,736. Patented July 20, 1886.

Fig. 21.

Attest:
J. W. Hoke.
Edward W. Farrell.

Inventor:
Frederick Shickle
by C. D. Moody
atty

UNITED STATES PATENT OFFICE.

FREDERICK SHICKLE, OF ST. LOUIS, MISSOURI.

TRAVELING CRANE.

SPECIFICATION forming part of Letters Patent No. 345,736, dated July 20, 1886.

Application filed August 17, 1885. Serial No. 174,654. (No model.)

*To all whom it may concern:*

Be it known that I, FREDERICK SHICKLE, of St. Louis, Missouri, have made a new and useful Improvement in Traveling Cranes, of which the following is a full, clear, and exact description.

A prominent feature of the improved construction consists in the power transmitting and controlling devices, whereby a main shaft, which is held and adapted to be rotated continuously in one direction in bearings upon suitable supports arranged alongside the field of the operation of the crane, is connected with the latter. It enables the crane to be shifted and its several trains of gearing for performing its several duties to be set in motion or arrested, or to be moved simultaneously or singly, and either when the crane is traveling or is stationary, as may be required. Two or more cranes can be driven from the same main shaft, and in such case the different cranes may travel simultaneously in the same or in contrary directions.

Another noticeable feature of the construction is its compactness. Its parts are brought so closely together as to materially minimize the crane as an obstacle to its own work. The load carried can be moved closer to the crane-pendant than can be done with cranes as heretofore constructed, and the crane, generally, taking into account its capacity, occupies less room than hitherto has been necessary. The crane is also so built as to enable all of the movements to be effected with great rapidity. Not only can a load be hoisted and lowered and shifted laterally, and the crane be moved forward and backward over its field of operation, but these movements, many of them, can be made simultaneously and more rapidly than heretofore has been practicable.

The structural features of the crane are valuable. The crane is so supported, and the mechanism for moving it over its field so contrived, as to enable it to be moved rapidly, safely, and without binding at any point. By the arrangement of the trolley the beam can be materially stiffened and strengthened. By the method shown of supporting the main shaft, the crane can be moved past a shaft-bearing. All of the movements of the crane can be controlled by a single person of comparatively little skill.

The annexed drawings, making part of this specification, illustrates the improvement.

Figs. 19, 20, 21, 22 are views introduced to facilitate an understanding of the construction. These views are all from the same point of view—namely, from that of Fig. 4. Fig. 17 shows mechanism used in moving the crane to and fro over its field of operation, termed, for convenience, the "traveler" mechanism. The view shows a continuous mechanism, beginning with the lever used in starting and stopping the traveler mechanism and ending with the vertical shaft whose gears engage with the fixed racks that extend alongside the field of the crane. The hoisting, the trolley, and the brake mechanisms are not shown in this view.

The same letters of reference denote the same parts.

The present crane is useful in many places and for many purposes; but it is designed more especially for, and at present used in connection with, a foundry-pit wherein water and gas pipes and other long heavy castings are made. The pit is not shown, it not being needed for an understanding of the improvement. At each side of the pit is a series of uprights or other suitable supports for upholding the line of rail upon which the crane is adapted to travel as it is moved bodily to and fro over the pit. The support at one side of the pit, or, if desired, an independent support, also sustains horizontal racks used in the movement of the crane; also, the main shaft used in shifting the crane and effecting the movements of its mechanisms. The crane in its general structure consists of a beam provided at one end with a pendant. In addition to the mechanism employed in shifting it from place to place above the pit the crane is supplied with mechanisms for hoisting and lowering the load, and for moving the trolley along the beam. There is also a supplementary mechanism, styled the "brake" mechanism, by means of which the operation of lowering a load is facilitated and controlled to advantage. These several mechanisms, although compactly associated and in part interacting, are mainly distinct from each other. They are each made in operation to reverse, and to that end each has a similar shaft provided with a double clutch, whose two parts can be respectively put into engagement with the shaft and cause it to rotate accordingly—that is, in the direction of the rotation of that one of the clutch parts with which, for the time being, the shaft is in engagement, and according to the direction in which the shaft is rotating is the crane shifted upon its track, the load hoisted or lowered, or the trolley moved along the beam to the right or left—that is, one of the two clutch parts in each of the mechanisms revolves always in one direction, while the other of the clutch parts revolves always in the opposite direction, from which it becomes possible, and as in the present instance, to form the six clutch parts into two distinct trains of gearing, one of which runs one way and the other of which runs the opposite way, and which trains are driven in the opposite directions described by means of a counter-shaft having two gears and interposed between the main shaft and the two trains, one of said last-named two gears taking its motion from a gear upon the main shaft and transmitting it to the middle clutch part of one of the trains, and thereby driving that train in one direction, and the other of said two gears, which is upon the opposite end of said counter-shaft and opposite the other train, transmitting its motion to the lower clutch part of the last-named train, and thereby driving that train in the opposite direction. Thence to effect any desired work with the crane, it is only necessary to throw the proper clutch part or parts into engagement with their shafts and the necessary movement or movements take place. For each movement there is an independent device for controlling it. By means of one lever and a system of leverage leading therefrom to the clutch belonging to the traveler mechanism that mechanism is set in operation and the crane shifted as desired. By means of another lever and leverage system leading to the clutch of the hoisting and lowering mechanism that mechanism is similarly controlled, and so on with the remaining mechanisms. The levers are grouped to enable a single person to direct all the movements.

That part of the structure which is general in its nature, including the main shaft and the means for transmitting its motion, will first be described, and afterward the various mechanisms will be more particularly described.

Figure 1:
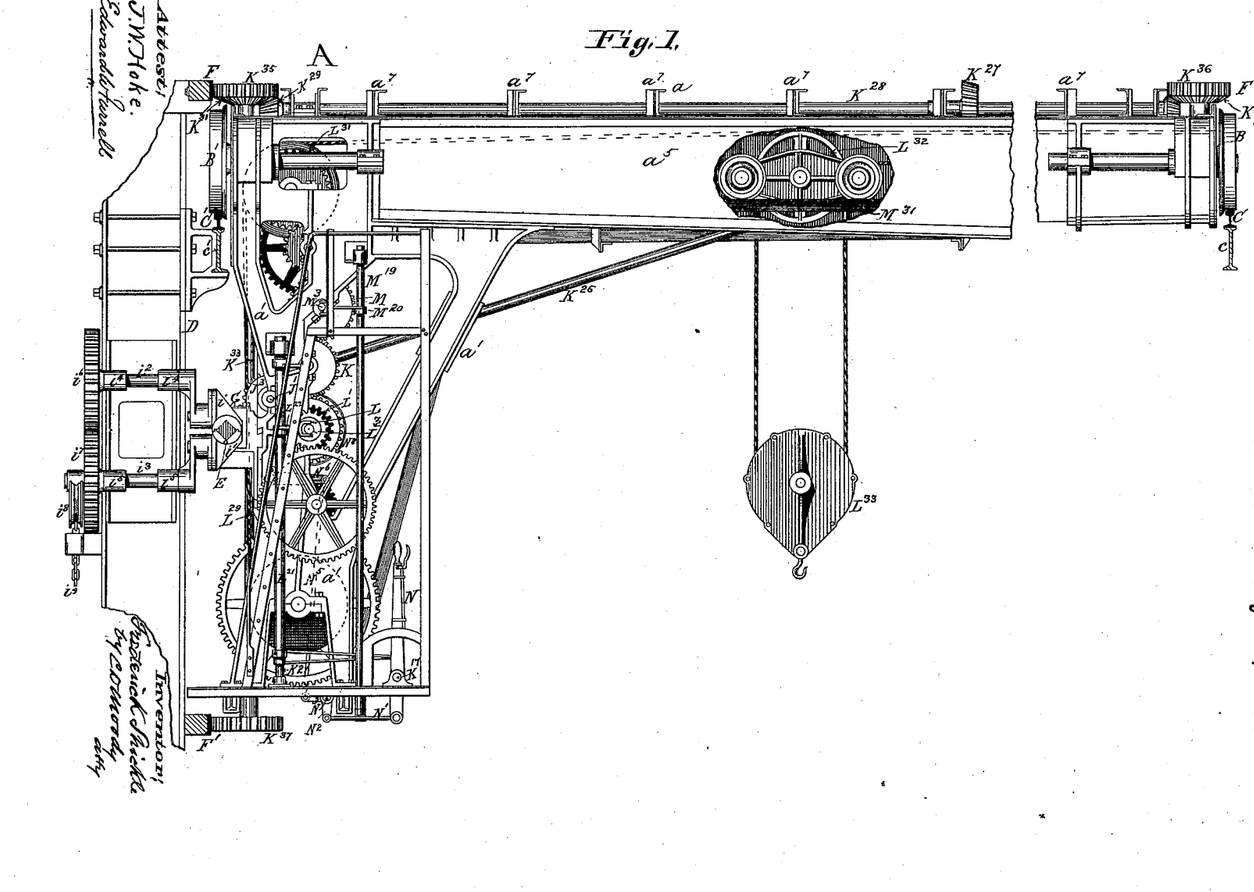
Figure 1 is a side elevation of the crane, a portion of the beam being broken away to exhibit the trolley.
Figures 2, 3:
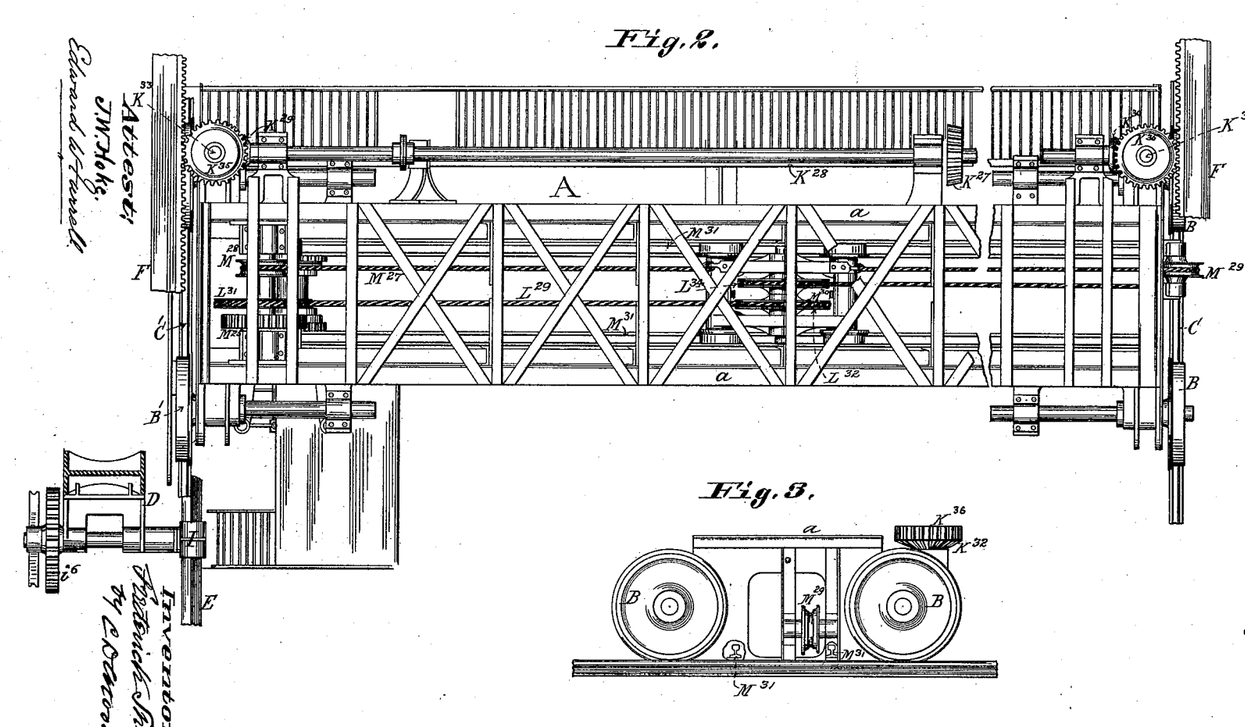
Fig. 2 is a plan.
Fig. 3 is an elevation of the outer end of the beam.
Figure 4:
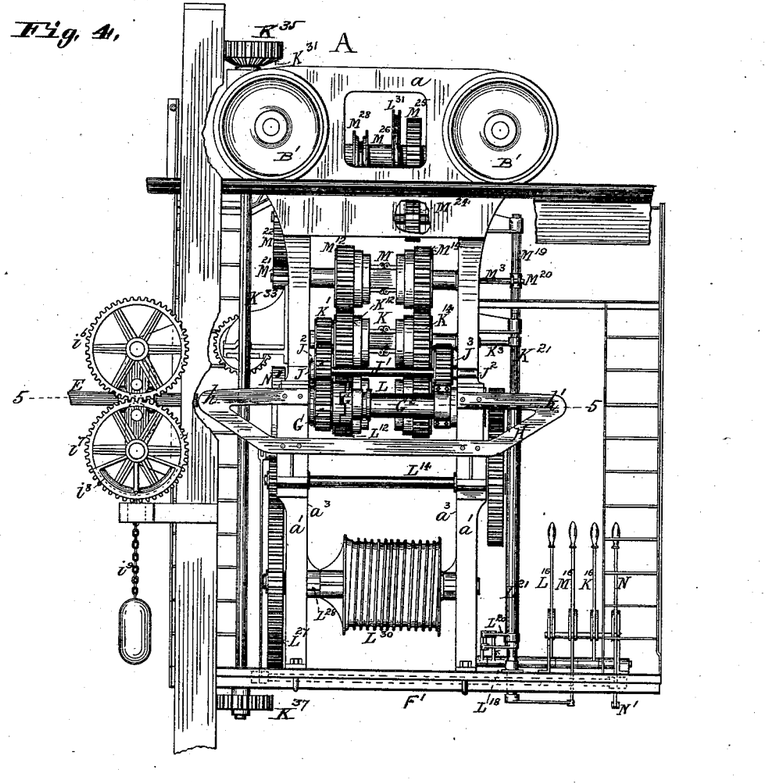
Fig. 4 is an elevation of the inner end of the crane.
Figure 5:
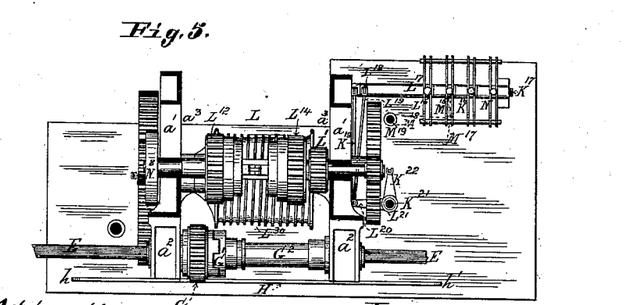
Fig. 5 is a horizontal section on the line 5 5 of Fig. 4.
Figures 6, 7, 8:
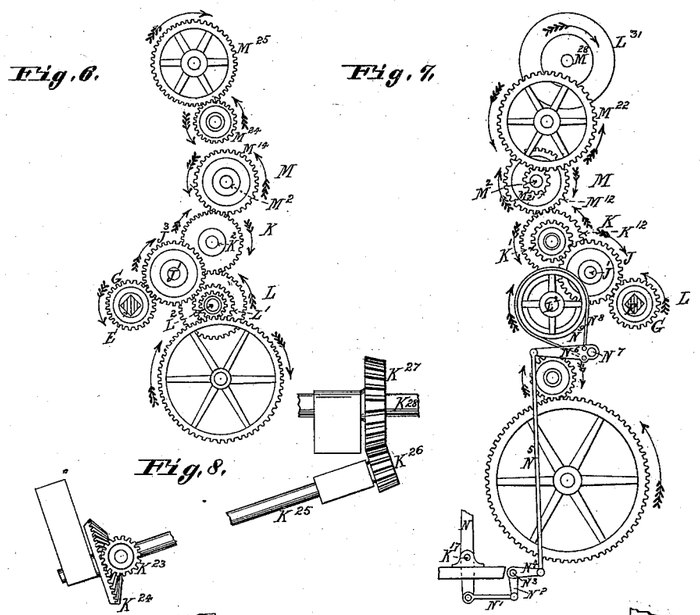
Figs. 6 and 7 are diagrams illustrating the relative arrangement of the various gears employed in the immediate vicinity of the crane pendant. The views are in opposite directions and show, respectively, different sets of gears.
Fig. 8 is a side elevation, showing a portion of the traveler mechanism, being the inclined shaft and gears used in transmitting the motion from the train in the vicinity of the crane-post to the horizontal shaft extending along the beam.
Figures 9, 10:
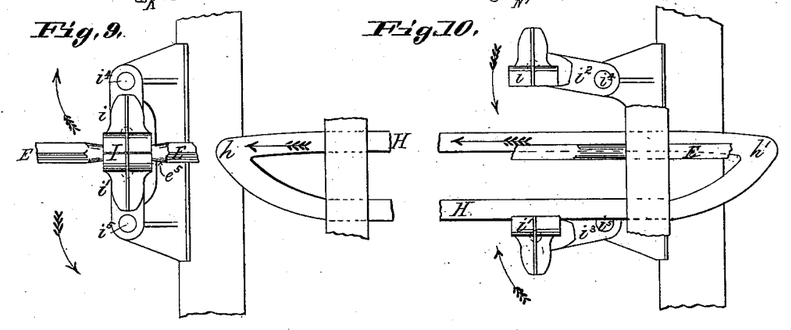
Fig. 9 is a side elevation showing one of the main-shaft bearings and a portion of the plow that is attached to the crane and used to open and displace the bearing. The view shows the plow as approaching the bearing, which is yet closed.
Fig. 10 is a view similar to that of Fig. 9, but showing the parts as when the plow is passing through the bearing.

A, Figs. 1, 2, 4, represents the crane having the beam $a$, and at the inner end of the beam is the pendant $a'$. The beam is the principal member of the construction. It is at its ends provided with wheels B B', to enable the crane to be moved upon the lines C C' of rail, which extend along at opposite sides, respectively, of the field of the crane. The line C at the outer end of the beam rests upon a suitable support, $c$. The line C' at the opposite or inner end of the beam is also suitably supported at $c'$, and the support $c'$, in turn, is preferably upheld by the same uprights, D, which sustain the main shaft E, from which the motions of the crane are derived, and the racks F F', which are used in effecting the shifting of the crane, and which extend horizontally along the field of the crane and respectively at or toward the level of the beam $a$, and at or toward the level of the lower end of the pendant $a'$. The main shaft E is also extended horizontally and to any desired distance. It may reach not only as far as the field of one crane, but past that, so as to operate other cranes beyond, or even other mechanisms. It is square in cross-section. It is furnished with a gear, G, Figs. 1, 4, 5, 6, 7, whose function it is to transmit the rotary motion of the main shaft to the crane mechanisms. As the main shaft constantly rotates, and as it is preferable to be able to disconnect the shaft motion, the gear G is not so connected with the main shaft as to necessarily follow its movement, but is hung upon a round bearing (not shown) upon a sleeve, $G^2$, that turns with and can be slipped longitudinally upon the main shaft, and the gear G is put into engagement with the shaft to rotate with it by means of a clutch, $G'$, which in turn rotates with the sleeve, but can be slipped upon it into engagement with the gear G whenever it is desired. If it is not desired to be thus able to disconnect the shaft motion, the clutch might be omitted and the gear and sleeve be one piece. The parts G $G'$ $G^2$ keep with the crane as it travels, and, preferably, by means of the arms $a^2$ $a^2$, Figs. 4, 5, which project laterally from the pendant $a'$ to embrace the parts G $G'$ $G^2$, substantially as shown. These arms $a^2$ $a^2$ also support a part, H, termed a "plow," the object of which is as follows: The main shaft necessarily is supported in bearings I, Figs. 1, 4, 9, 10. As the parts G $G'$ $G^2$ keep, as stated, with the crane in its travelings, these bearings must be passed. To this end the bearings are constructed to open and give way as the crane comes along, to return again to the support of the main shaft after the crane has passed. This is accomplished by attaching the upper, $i$, and lower, $i'$, parts of the bearing respectively, to the crank-shafts $i^2$ $i^3$, which, in turn and respectively, are adapted to rotate in the bearings $i^4$ $i^5$, and beyond these bearings are provided with the gears $i^6$ $i^7$. These gears engage. One of the shafts $i^2$ $i^3$—say the shaft $i^3$—is provided with a grooved segment, $i^8$, from the center of which hangs a weighted chain, $i^9$. The ends $h$ $h'$ of the plow H project sufficiently and properly to encounter the parts $i$ $i'$ in advance of the arms $a^2$ $a^2$ of the crane-pendant. The end $h$ or $h'$, according to the direction in which the crane is traveling, operates to force the parts $i$ $i'$ apart, and to thereby cause the crank-shafts $i^2$ $i^3$ to turn in their bearings and the weighted chain to be wound upon the segment. Owing to the engagement of the gears $i^6$ $i^7$ the upper bearing part, $i$, is lifted sufficiently, as in Fig. 10, for the crane, with its attachments, to pass. The plow is extended downward below the level of the main shaft sufficiently to cause the lower bearing part, $i'$, to suitably open. After the crane has passed the weighted chain operates to restore the various parts of the bearing I to their original positions. The pendent arms $a^2$, also preferably are perforated to receive the main shaft. Therefore, as the crane is passing a bearing, I, the arms $a^2$ operate as a hanger to support the main shaft E. The motion of the main shaft E is, through the gear G, imparted to a gear, J, that is fast upon the counter-shaft $J'$, Figs. 1, 4, 6, 7. The counter-shaft is held and adapted to be rotated in bearings $J^2$ upon the pendant $a'$, and is also furnished with the gear $J^3$. The gear J imparts its motion to the gear $K'$ of the middle clutch, K, Figs. 4, 6, 7, 19, 1. The gear $J^3$, at the other end of the counter-shaft, imparts its motion to the gear $L'$ of the lower clutch L, Figs. 1, 5, 6. The gears $K'$ and $L'$, respectively, belong to the two trains of gearing above named as revolving in opposite directions, and whose construction and operation will now be more particularly set forth.

Figure 11:
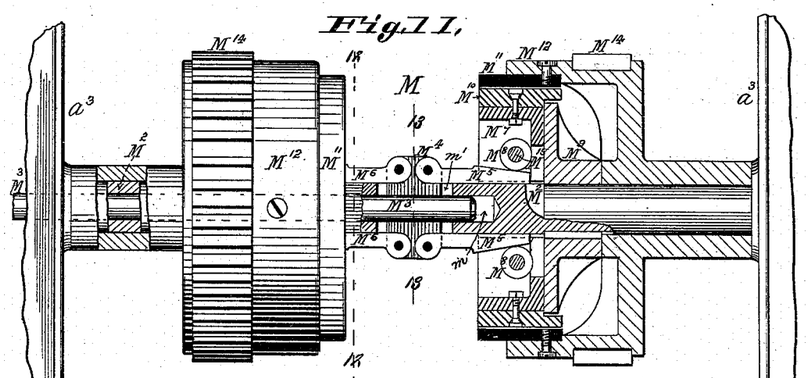
Fig. 11 is a view, partly in elevation and partly in longitudinal section, and upon an enlarged scale, of one of the clutches employed in many places throughout the system of gears. The section is on line 11 11 of Fig. 12.

Within the pendant $a'$, which in effect is a frame or housing for supporting and containing most of the shafting, gearing, &c., that compose the mechanisms of the crane, are among other parts, three horizontal shafts parallel with the main shaft E, and arranged one above the other, or sufficiently so to justify styling them the "lower," the "middle," and the "upper" shafts. These shafts $L^2$ $K^2$ $M^2$, Figs. 6, 7, 19, 20, 21, 22, are journaled in the cheeks $a^3$ $a^3$ of the pendant, and are respectively provided with a double clutch, L K M. The construction of this clutch can best be learned from Figs. 11, 12, 13, 14, 15. The clutches are substantially similar, the only difference being that the lower clutch, L, has the extra gear $L'$, and that the middle clutch, K, has the extra gear $K'$, both above mentioned. Beginning at one end, and being the left-hand end of the clutch-shaft $M^2$, as shown in Fig. 11, and being the right-hand end of the clutch-shaft, as shown in Fig. 4, the clutch-shaft is perforated centrally and longitudinally, the perforation $m$, Fig. 11, extending somewhat beyond the middle of the clutch-shaft. A rod, $M^3$, is adapted to be moved reciprocatingly a short distance in the perforation.

Figures 12, 13, 14, 15, 16, 17, 18:
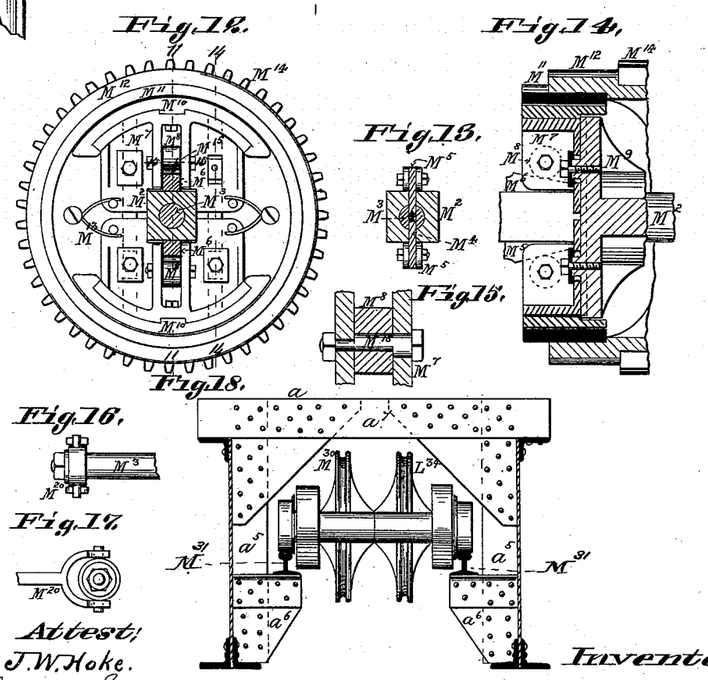
Fig. 12 is a section on the line 12 12 of Fig. 11.
Fig. 13 is a section on the line 13 13 of Fig. 11.
Fig. 14 is a section on the line 14 14 of Fig. 12.
Fig. 15 is a section on the line 15 15 of Fig. 12.
Fig. 16 is a side elevation of the outer end of the rod used in operating the clutch, being the rod which is adapted to be moved longitudinally in the clutch to operate the wedges.
Fig. 17 is an end view of the parts of Fig. 16.
Fig. 18 is a cross-section of the beam, showing the trolley, but omitting the traveler-shaft.

$M^4$ represents a cross-head, Figs. 11, 13, which is fastened to the rod $M^3$, and adapted to move with it. The clutch-shaft is slotted transversely at $m'$, to receive the cross-head and provide for its movement.

$M^5$ $M^6$ represent wedges fastened at one end to the cross-head, and extending thence upon the outside of the clutch-shaft, and respectively toward the opposite ends of the clutch-shaft. Their function is to operate what may be termed the "friction-shoes," $M^7$, which parts are adapted to be moved radially toward and from the clutch-shaft. When the rod $M^3$, the cross-head $M^4$, and the wedges $M^5$ are moved toward the right hand, Fig. 11, the wedges encounter the roller-bearings $M^8$. These roller-bearings, Figs. 11, 12, 14, are attached to the friction-shoes, which move under the action of the wedges radially outward upon the part $M^9$, which serves as a guide therefor, and so as to cause the facing $M^{10}$ of the shoe to bear against the inner side of the facing $M^{11}$ of the gear $M^{12}$, and when the parts $M^{10}$ $M^{11}$ are thus pressed together, the gear $M^{12}$, which previously has been loose upon the clutch-shaft, becomes fastened to it and sufficiently to cause the clutch-shaft to follow the gear $M^{12}$ in its rotation. When the rod $M^3$ is moved in the opposite direction in the perforation $m$, the cross-head $M^4$ moves in the opposite direction in the slot $m'$. This causes the wedges $M^5$ to be withdrawn from their wedging position between the clutch-shaft and the roller-bearings $M^8$, whereupon the facing $M^{10}$, influenced by the action of the springs $M^{13}$, Fig. 12, ceases to bear against the facing $M^{11}$, and the gear $M^{12}$ and clutch-shaft are disconnected, and the clutch-shaft no longer is responsive to the movement of the gear. If the cross-head $M^4$ is moved only to the middle of the slot $M'$, the clutch-shaft is connected neither with the gear $M^{12}$ nor with the gear $M^{14}$, which is arranged upon the clutch-shaft toward the opposite end thereof, and is adapted by similar means to be similarly connected with and disconnected from the clutch-shaft; for, by continuing to move the cross-head to the left, Fig. 11, the wedges $M^6$ similarly act upon a mechanism (not shown) within the gear $M^{14}$, and similar to that described as within the gear $M^{12}$, and thereby cause the clutch-shaft to become bound to the gear $M^{14}$, and to follow its rotation. The part $M^9$ is keyed to and rotates with the clutch-shaft. The clutch-shaft is squared along the central portion, where the wedges $M^5 M^6$ operate. As the facings $M^{10} M^{11}$ are liable to wear, the shafts $M^{15}$, Figs. 12, 15, of the roller-bearings $M^8$, are made eccentric, substantially as represented. By turning these shafts around the wedges can act to set the shoes farther out, and thereby provide for the difference between the facings arising from the wear.

The above description of the upper clutch, M, applies similarly to the middle clutch, K, and the lower clutch, L. The clutch K is similarly provided with gears $K^{12}$ and $K^{14}$, which, by means of a rod, $K^3$, Fig. 19, can be alternately brought in connection with the clutch-shaft K, so as to cause that shaft to follow the movement of whichever gear it is in connection with, and the clutch L, by means of the rod $L^3$, Figs. 1, 21, can have its main shaft $L^2$ made similarly responsive to its gears $L^{12} L^{14}$, Fig. 4.

The mechanisms above described upon each of the clutch-shafts may be styled, generally, the "two clutch" parts, and the six clutch parts (two parts upon each of three shafts) are formed into the two trains of gearing above referred to as follows: The gear $L^{12}$ engages with the gear $K^{12}$, and that, in turn, with the gear $M^{12}$, forming one of the trains, while the gear $L^{14}$ engages with the gear $K^{14}$, and that, in turn, with the gear $M^{14}$, forming the other of the trains. Now, by reason of the gear J of the counter-shaft $J'$ engaging with a gear, $K'$, that is fastened to the side of the gear $K^{12}$, the middle gear of the train $L^{12} K^{12} M^{12}$, and the gear $J^3$ of the counter-shaft $J'$ engaging with a gear, $L'$, that is fastened to the side of the gear $L^{14}$, the lower gear of the train $L^{14} K^{14} M^{14}$, the two trains revolve in opposite directions, as also do the gears of each clutch-shaft—that is, the gears $L^{12} L^{14}$ revolve constantly in opposite directions, the gears $K^{12} K^{14}$ in opposite directions, and the gears $M^{12} M^{14}$ in opposite directions. With the motions of these various gears thus established it is only necessary, on the one hand, to provide means for connecting at will each of the clutch-shafts with either one of the parts or gears, and, on the other hand, to provide for the transmission of the motion of the clutch-shaft to the mechanism belonging to that clutch-shaft. This part of the construction is more readily understood in connection with Figs. 19, 20, 21, 22.

Figure 19:
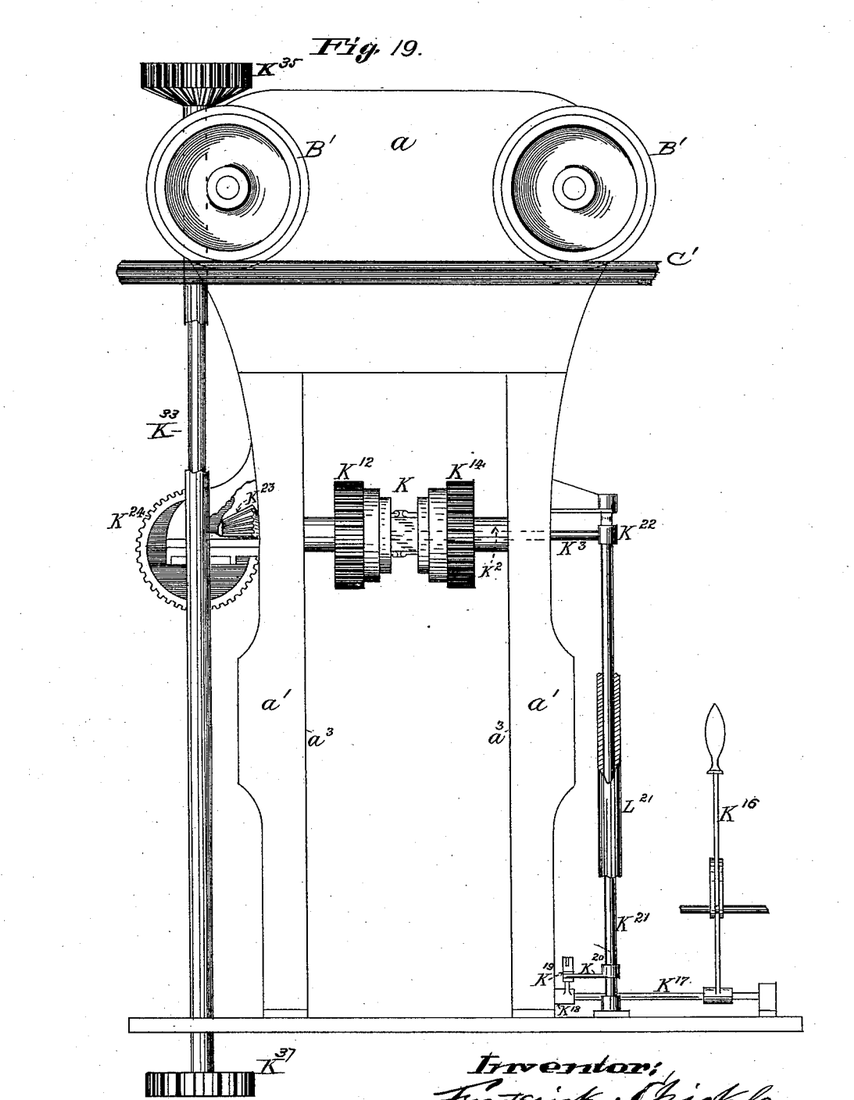

Fig. 19 represents the mechanism especially used in shifting the crane. It may be called the "traveler" mechanism. $K^{16}$ represents a lever, Figs. 4, 5, 19, keyed to the shaft $K^{17}$, which is adapted to be rotated in suitable bearings, and is provided with an arm, $K^{18}$. A connecting-rod, $K^{19}$, leads from the arm $K^{18}$ to an arm, $K^{20}$, keyed to the vertical shaft $K^{21}$, Figs. 1, 2, 4, 5, 19. At the upper end of this shaft, which is adapted to be rotated in suitable bearings, is fastened an arm, $K^{22}$. This last-named arm is jointed to the rod $K^3$, whose office it is to effect, by its longitudinal movement within the perforation in the clutch-shaft $K^2$, the engagement and disengagement of the clutch-gears $K^{12} K^{14}$. When the lever $K^{16}$ is turned upright, neither of the gears $K^{12} K^{14}$ is in engagement; but by turning the lever down from an upright position the clutch-shaft is brought into engagement with one of the gears $K^{12} K^{14}$, (according to which way the lever is turned down,) and the motion of that gear is imparted to the clutch-shaft. This shaft at its further end is furnished with a bevel-gear, $K^{23}$, Figs. 19, 8, which engages with a bevel-gear, $K^{24}$, Figs. 19, 8, upon the inclined shaft $K^{25}$. This last-named shaft extends from the pendant upward and outward to engage, by means of the bevel gear $K^{26}$, Fig. 8, with a bevel-gear, $K^{27}$, Figs. 1, 2, 8, upon the horizontal shaft $K^{28}$, Figs. 1, 2, 8. This last-named shaft extends along the top of the crane-beam from end to end thereof, and at its ends, respectively, the shaft is supplied with the bevel-pinions $K^{29} K^{30}$, and which respectively engage with the bevel-gears $K^{31} K^{32}$, attached, respectively, to the upright shafts $K^{33} K^{34}$, Fig. 2. These last-named shafts are also furnished with the spur-gears $K^{35} K^{36}$, respectively, which engage, respectively, with the horizontally-extended racks F F, which, as stated, extend along the field of the crane at either side thereof. The gears $K^{35} K^{36}$, by reason of their above-described connection with the clutch-shaft $K^2$, are caused to rotate, and the crane in consequence is caused to travel. The inclined shaft $K^{25}$ connects with the horizontal shaft $K^{28}$ at the middle of the latter, and this for the purpose of distributing the torsion of the horizontal shaft equally between its ends, for if the connection were to be made toward one end of the horizontal shaft one end of the crane-beam is liable to travel faster than the other, and thereby occasion trouble. All of the above-named shafts are suitably journaled in the frame-work of the structure. The upright shaft $K^{33}$ is extended downward to the bottom of the pendant $a'$, and there journaled, and also finished with another gear, $K^{37}$, which engages with another rack, $F'$, which extends parallel with the upper rack, F, but at the level of the bottom of the pendant. This last-named engagement is of value in effecting the proper movement of the crane. By reversing the lever K¹⁶ the clutch-shaft K² is brought into engagement with the other of the gears K¹² K¹⁴, and the motion of the crane is reversed.

Figure 20:
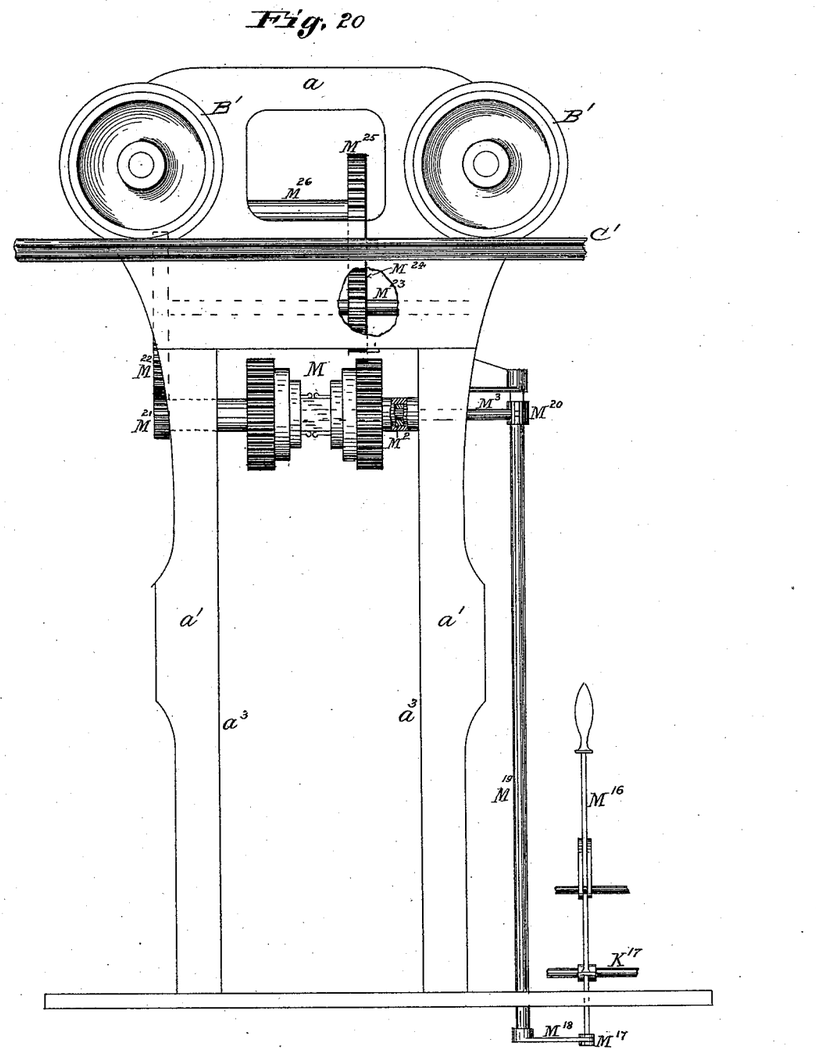
Fig. 20 is an analogous view showing mechanism used in working the trolley, but not showing the traveler, the hoisting, and the brake mechanism.

Fig. 20 represents the mechanism especially used in moving the trolley along the crane-beam. M¹⁶ represents a lever arranged alongside the lever K¹⁶ and similarly operated. It is journaled on the shaft K¹⁷, and at its lower end is provided with a connecting-rod, M¹⁷, (shown in dotted lines, Fig. 5,) which leads to an arm, M¹⁸, that projects from and is fast on a vertical shaft, M¹⁹, Figs. 4, 5, which, in turn, and at its upper end, is provided with an arm, M²⁰, Figs. 1, 4. This arm operates the rod M³ of the clutch M, as in the manner described. The clutch-shaft M² is provided at its farther end with a pinion, M²¹, which engages with a gear, M²², upon the shaft M²³, which also carries the gear M²⁴. This last-named gear engages with the gear M²⁵, Figs. 20, 4, 2, upon the shaft M²⁶. A rope, M²⁷, leads around a sprocket-wheel, M²⁸, upon the shaft M²⁶, and around a pulley, M²⁹, at the opposite end of the crane-beam a, and the two ends of the rope are secured to the trolley M³⁰. By suitably operating the lever M¹⁶ the trolley can be rolled upon its rails M³¹, Figs. 1, 2, 18, and toward one end or the other of the beam, according as the lever M¹⁶ is turned.

Figure 21:
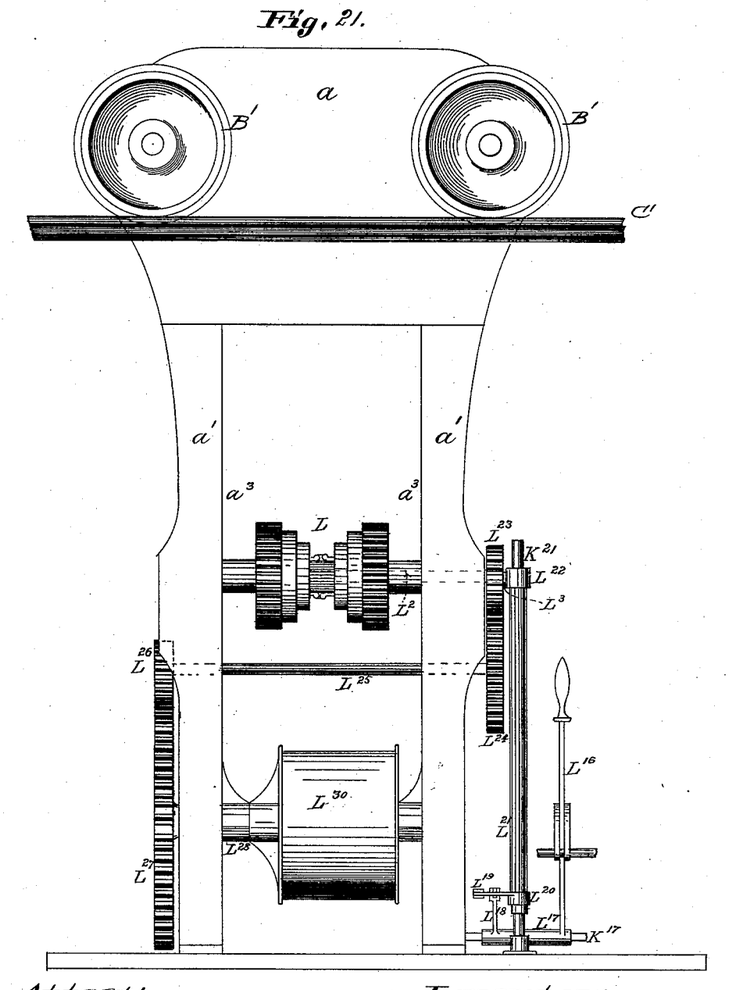
Fig. 21 is an analogous view showing the hoisting mechanism, but not showing the traveler, the trolley, and the brake mechanisms.

Fig. 21 represents the mechanism for operating the hoist. L¹⁶ represents a lever alongside the lever M¹⁶, and similarly operated. The lever is attached to a sleeve, L¹⁷, loose upon its shaft K¹⁷, and provided with an arm, L¹⁸, from which a connecting-rod, L¹⁹, (not distinctly shown in Fig. 21,) leads to an arm, L²⁰, Figs. 4, 5, that is fast on the vertical sleeve L²¹. This sleeve is loose on the shaft K²¹, and is provided with an arm, L²², Figs. 21, 1, which connects with and operates the rod L³ of the clutch L. The clutch-shaft L² is at its inner end furnished with a pinion, L²³, which gears with the wheel L²⁴ upon the shaft L²⁵. This shaft also and at its other end has a pinion, L²⁶, which engages with the gear L²⁷ upon the drum-shaft L²⁸. A rope, L²⁹, Figs. 1, 2, passes from the drum L³⁰ over the pulley L³¹, and thence over the trolley-pulley L³², thence downward through the block L³³, upward over the trolley-pulley L³⁴, and finally is made fast at the farther end of the crane-beam. By suitably operating the lever L¹⁶ the rope can be wound upon or unwound from the drum L³⁰, and the load hoisted or lowered, as is desired.

Figure 22:
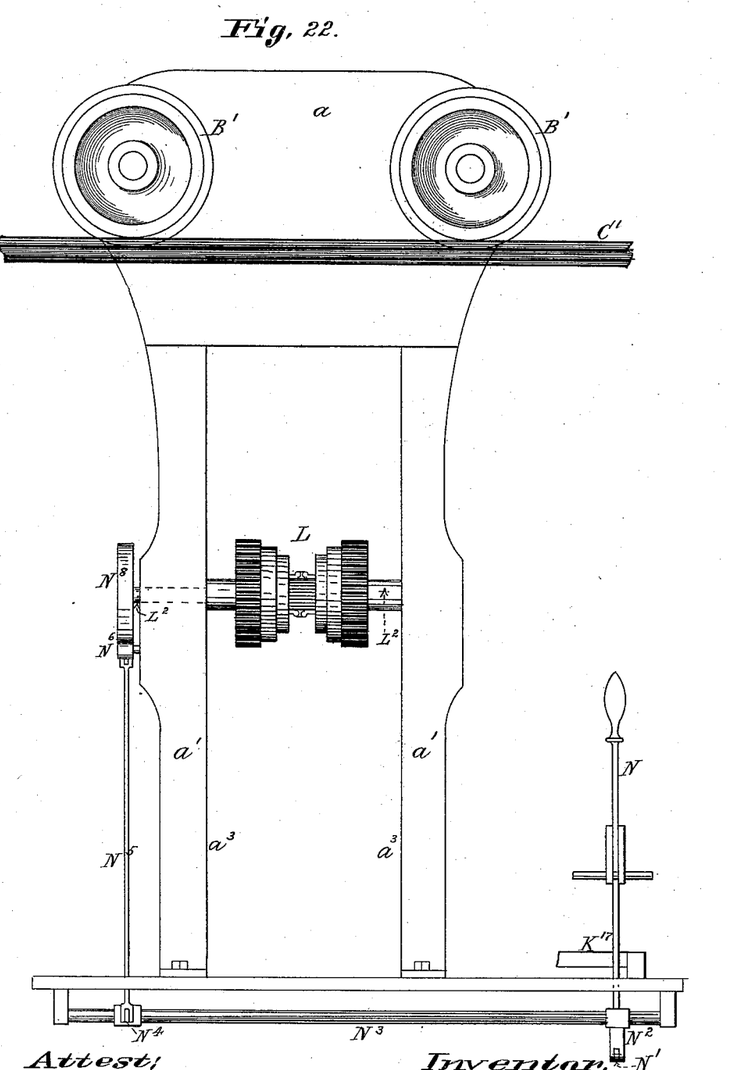
Fig. 22 shows what is styled the "brake" mechanism, but omits the traveler and the trolley mechanisms and all but the clutch of the hoisting mechanism. From these last four views many of the minor details, not being necessary to an understanding of the improvement, are also omitted.

Fig. 22 illustrates the mechanism used more especially in operating the brake mechanism. N, Figs. 1, 4, 5, 7, 22 represents a lever alongside the traveler-lever, and similarly operated. It is journaled on the shaft K¹⁷, and from its lower end a connecting-rod, N′, leads to a bell-crank, N², Figs. 1, 22, 7, that is keyed on the shaft N³, which also is furnished with an arm, N⁴. A connecting-rod, N⁵, Figs. 1, 7, 22, leads from this last-named arm to a brake-band lever, N⁶, which is pivoted at N⁷, and is adapted to operate a brake-band, N⁸, Figs. 1, 4, 5, 7, that passes around the brake-wheel N⁹, Fig. 7, that is keyed to the clutch-shaft L². Then by disconnecting the gears L¹² L¹⁴ from the clutch-shaft L², and by suitably operating the lever N, the load can be lowered rapidly and more readily than by means of the lever L¹⁶.

An additional feature of the improvement is the location of the trolley upon the crane-beam a. Heretofore it has been customary to adapt the trolley to be moved upon the top of the beam. In consequence of this practice it is impracticable to properly stiffen the beam, for the tackle leading downward from the trolley prevents the two sides of the beam from being tied and braced below the level of the trolley. In the case of a traveling crane for a foundry-pit it is especially desirable to prevent vibration in the trolley-support. Large ladles, containing oftentimes several tons of molten metal, and filled to the brim, must be swiftly shifted from place to place, an operation that is calculated to strain and shake the crane-beam, which in practice may be fifty or sixty feet long, and, in consequence, to cause the metal to be spilled. There is also a possibility of the beam parts spreading so as to dislodge the trolley from the track, and thereby, when a heavy load is being carried, causing serious difficulty. These objections are overcome in the present construction by contriving to carry the trolley below the top of the crane-beam, and preferably in the manner shown in Figs. 1, 18. The trolley is dropped to between the sides $a^5$ $a^5$ of the beam, and the trolley-rails M³¹ are supported on on brackets $a^6$ $a^6$, which project inwardly from the sides $a^5$. This leaves the top of the beam free to be braced and tied laterally, as by means of the cross plates or bars $a^7$ $a^7$. It also enables the sides $a^5$ $a^5$ to be made much deeper than hitherto has been practicable, for the trolley being at or toward the level of the bottom of the beam, the sides are not in the way of the tackle when it is drawn sidewise. Figs. 16, 17 illustrate this mode of connecting the clutch-shaft rod with the part that moves it.

The main shaft opposite the bearings I is rounded. The sleeve G is long enough to lap past this rounded portion $e^5$, Fig. 9.

I claim—

1. The combination of the shaft E, the crane A, having the arms $a^2$ $a^2$, the gear G, the sleeve G′, and the clutch G², substantially as described.

2. The combination of the crane A, the wheels B B′, and the lines C C′ of rails, said crane at both ends of its beam and also at the lower end of its pendant having gears engaging in horizontally-extended racks, substantially as described.

3. The traveling crane A, having at each end of its beam and also at the lower end of its pendant a gear engaging in a rack extending alongside its field, substantially as described.

4. A traveling crane, A, consisting, generally, of the beam $a$ and the pendant $a'$, and having its beam provided at its ends with wheels, to enable it to be moved upon lines of rail, and having its pendant carried by means of a gear therein engaging with a rack that extends alongside the field of the crane at that level, substantially as described.

5. A traveling crane having its pendant $a'$ steadied and guided in the movement of the crane by means of a gear upon the pendant engaging in a rack alongside, substantially as described.

6. The traveling crane A, having the plow H, for the purpose described.

7. The combination of the traveling crane A, the plow H, the shaft E, and the bearing I, made to open and close, substantially as described.

8. The combination of the shaft E and the bearing I, said bearing being made to open and close, as described.

9. The combination of the shaft E, the bearing parts $i$ $i'$, the crank-shafts $i^2$ $i^3$, the gears $i^6$ $i^7$, the segment $i^8$, and the weighted chain $i^9$, substantially as described.

10. The combination of the traveling crane A, having the plow H, with the shaft E and the movable bearing part $i$, substantially as described.

11. The combination of the bearing parts $i$ $i'$, the crank-shafts $i^2$ $i^3$, the bearings $i^4$ $i^5$, the gears $i^6$ $i^7$, the segment $i^8$, and the weighted chain $i^9$, substantially as described.

12. The combination of the shaft E, the gear G, and the traveling crane having the counter-shaft J', provided with the gears J $J^3$, as and for the purpose described.

13. The combination of the shaft E, the gear G, and the traveling crane having the counter-shaft J', provided with the gears J $J^3$, the middle clutch, K, having the gear K', and the lower clutch, L, having its gear L', substantially as described.

14. The combination of the shaft J', having the gears J $J^3$, with the middle clutch, K, having the gear K', and the lower clutch, L, having the gear L', substantially as described.

15. The traveling crane A, having the three clutches L K M, constructed as described, in combination with the shaft J', having the gears J $J^3$, substantially as described.

16. The three clutches L K M, having the gears, as described, to form the two trains $L^{12}$ $K^{12}$ $M^{12}$ and $L^{14}$ $K^{14}$ $M^{14}$, as described.

17. The combination of the perforated shaft $M^2$, the rod $M^3$, the cross-head $M^4$, the wedges $M^5$ $M^6$, the shoes $M^7$, the bearings $M^8$, the guide $M^9$, and the gear $M^{12}$, substantially as described.

18. The clutch M, having the two gears $M^{12}$ $M^{14}$, each of which can be similarly fastened to the clutch-shaft $M^2$ by means of the wedges $M^5$ $M^6$, the shoes $M^7$, the bearings $M^8$, and the guides $M^9$, substantially as described.

19. The combination of the shaft $M^2$, the wedges $M^5$, and the rollers $M^8$, and the eccentric-shaft $M^{15}$, as described.

20. The combination of the lever $K^{16}$, the shaft $K^{17}$, the arm $K^{18}$, the rod $K^{19}$, the arm $K^{20}$, the shaft $K^{21}$, the arm $K^{22}$, and the rod $K^3$, substantially as described.

21. The combination of the shaft $K^2$, the gears $K^{23}$ $K^{24}$, the inclined shaft $K^{25}$, the gears $K^{26}$ $K^{27}$, and the horizontal shaft $K^{28}$, substantially as described.

22. The combination of the horizontal shaft $K^{28}$, the pinions $K^{29}$ $K^{30}$, the gears $K^{31}$ $K^{32}$, the shafts $K^{33}$ $K^{34}$, the gears $K^{35}$ $K^{36}$, and the racks F F, substantially as described.

23. The combination of the inclined shaft $K^{25}$ and the horizontal shaft $K^{28}$, said shaft $K^{25}$ being connected with the shaft $K^{28}$ at its middle, as and for the purpose described.

24. The combination of the lever $M^{16}$, the rod $M^{17}$, the arm $M^{18}$, the shaft $M^{19}$, the arm $M^{20}$, and the rod $M^3$, substantially as described.

25. The combination of the shaft $M^2$, the pinion $M^{21}$, the gear $M^{22}$, the shaft $M^{23}$, the gears $M^{24}$ $M^{25}$, the shaft $M^{26}$, the chain $M^{27}$, the wheel $M^{28}$, the pulley $M^{29}$, and the trolley $M^{30}$, substantially as described.

26. The combination of the lever $L^{16}$, the sleeve $L^{17}$, the shaft $K^{17}$, the arm $L^{18}$, the rod $L^{19}$, the arm $L^{20}$, the sleeve $L^{21}$, the arm $L^{22}$, and the rod $L^3$, substantially as described.

27. The combination of the shaft $L^2$, the pinion $L^{23}$, the wheel $L^{24}$, the shaft $L^{25}$, the pinion $L^{26}$, the gear $L^{27}$, and the drum-shaft $L^{28}$, substantially as described.

28. The combination of the lever N, the shaft $K^{17}$, the rod N', the arm $N^2$, the shaft $N^3$, the arm $N^4$, the rod $N^5$, the brake-band lever $N^6$, the brake-band $N^8$, and the brake-wheel $N^9$, and the clutch-shaft $L^2$, substantially as described.

29. A crane-beam consisting, mainly, of two sides braced and tied together at their upper edges, and having the trolley arranged to travel between said sides below the top braces and ties, substantially as described.

30. The crane-beam $a$, having its sides $a^5$ $a^5$ braced and tied by means of the parts $a^7$ $a^7$, and having the trolley-supports attached to the sides $a^5$ $a^5$, below the top of the beam, as and for the purpose described.

31. The combination of the squared shaft E, the sliding sleeve $G^2$, the clutch G', adapted to be slipped upon the sleeve, and the gear G, hung upon a round bearing upon the sleeve, substantially as described.

32. The combination of the shaft $M^2$, the wedges $M^5$, the bearings M, the shoes $M^7$, the guide $M^9$, and the gear or pulley $M^{12}$, against which the shoe is wedged, substantially as described.

Witness my hand.

FREDERICK SHICKLE.

Witnesses:
C. D. MOODY,
J. W. HOKE.